No. 870,183. PATENTED NOV. 5, 1907.
E. B. KENT.
TRANSMISSION GEARING.
APPLICATION FILED OCT. 25, 1906.
2 SHEETS—SHEET 1.
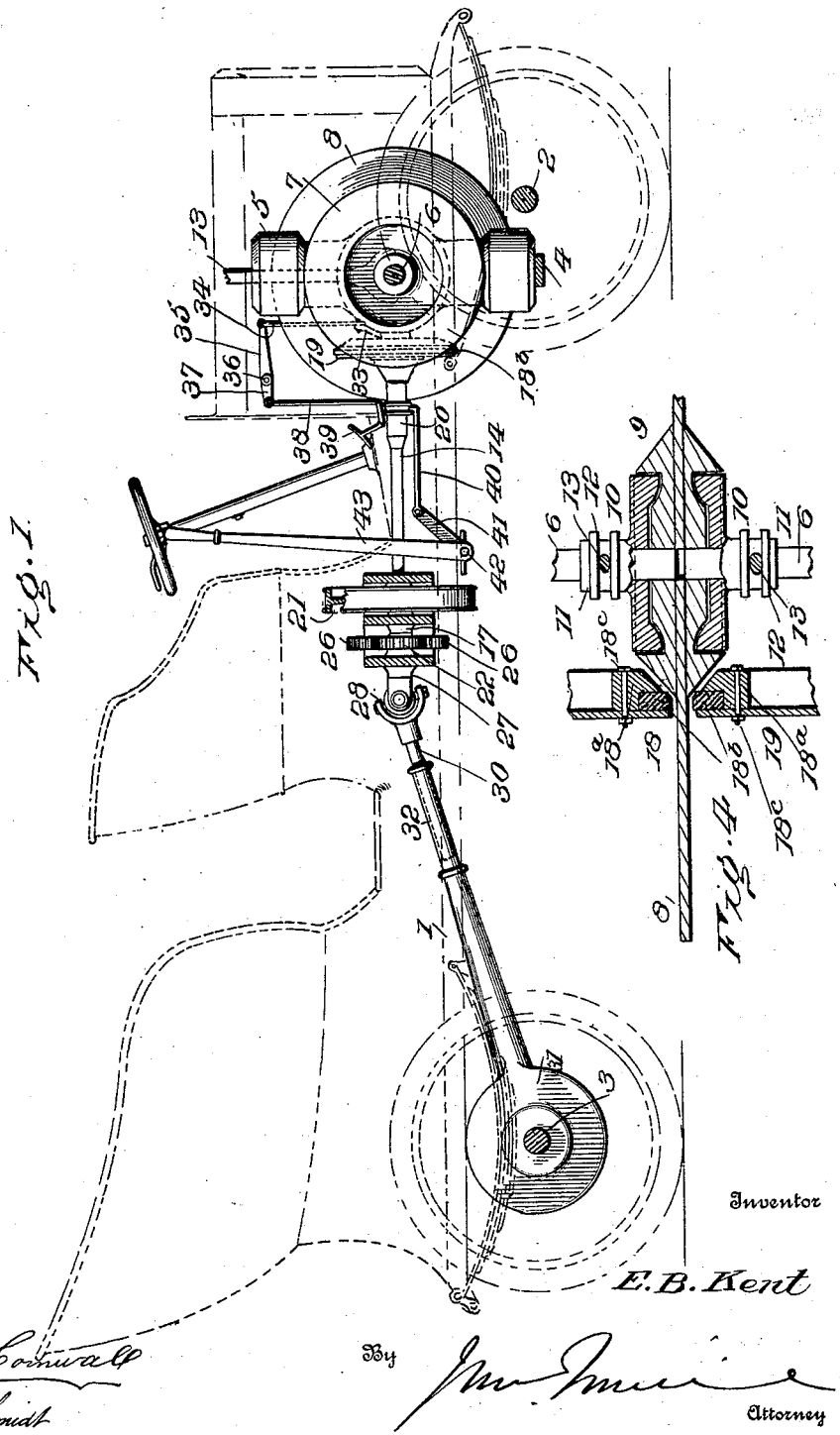
Witnesses
Inventor
E. B. Kent
By
Attorney

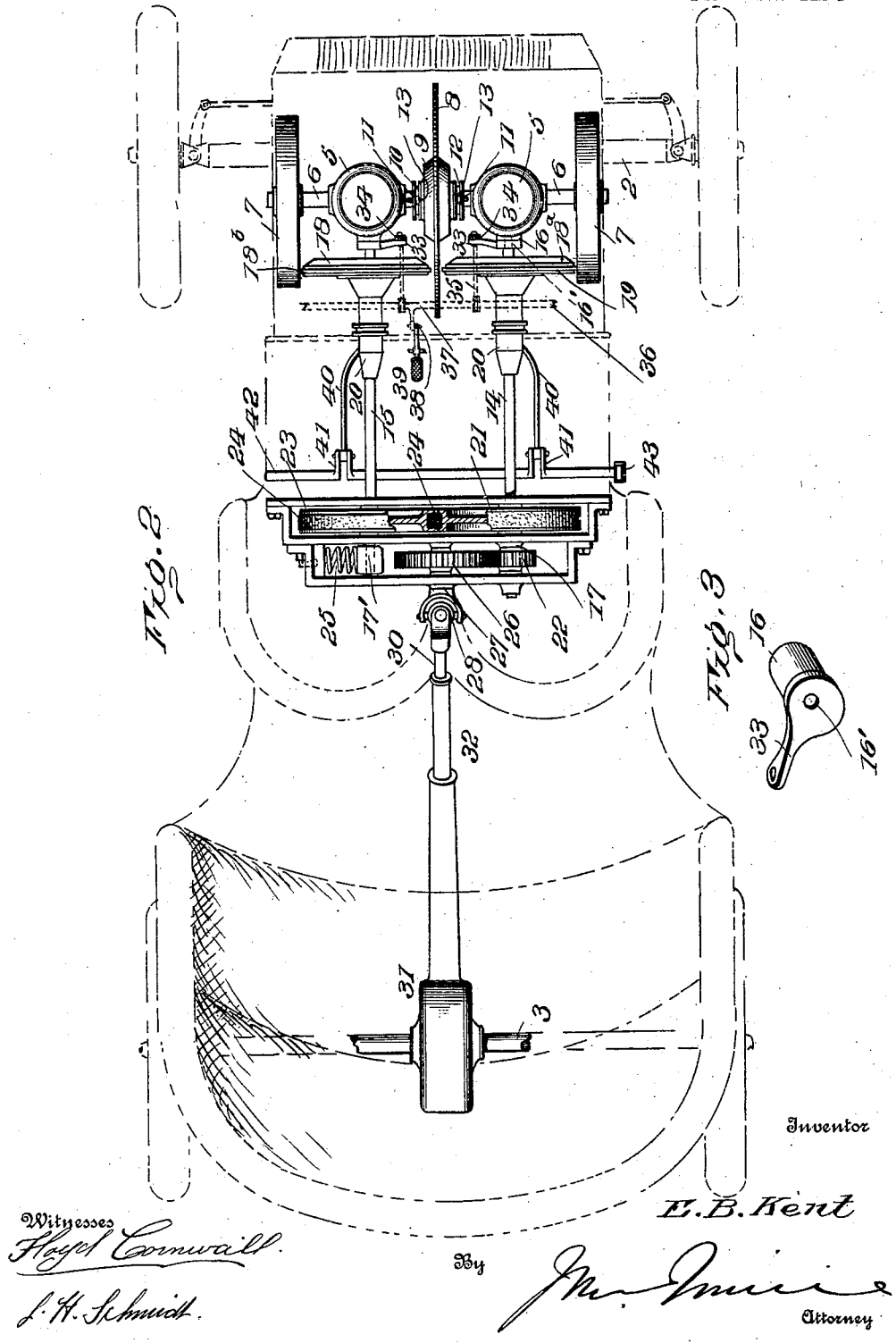

UNITED STATES PATENT OFFICE.

ELIHU BURRETT KENT, OF LANSING, MICHIGAN.

TRANSMISSION-GEARING.

No. 870,183.　　　　　Specification of Letters Patent.　　　　　Patented Nov. 5, 1907.

Application filed October 25, 1906. Serial No. 340,597.

*To all whom it may concern:*

Be it known that I, ELIHU BURRETT KENT, a citizen of the United States of America, residing at No. 402 Larch street N., in the city of Lansing, in the county of Ingham and State of Michigan, have invented certain new and useful Improvements in Friction Transmission of Power-Gearing; and I do hereby declare the following to be a full, clear, and exact description of the invention, such as will enable others skilled in the art to which it appertains to make and use the same.

This invention relates to improvements in transmission gearing, designed primarily for automobiles or like vehicles.

The object of the invention is to provide a simple and durable construction for motor vehicles, whereby a variable range of speed may be under perfect control of an operator.

A further object of the invention is to provide friction gears, arranged in such manner that with little effort the operator may increase or decrease the speed or reverse the direction of movement of the vehicle, at any time without running liability of causing the parts to become locked or broken by the sudden jarring incident to the change being made.

The invention also relates to the specific details of construction of the bearings carrying a part of the friction gearing, and the means for causing the transmitting friction gears to contact with each other, and at the same time permit them to spread apart in case of a sudden reversing of the mechanism.

Other objects and advantages will be hereinafter referred to and particularly pointed out in the claims.

In the drawings—Figure 1, is a side elevation of my invention. Fig. 2, is a top plan view of the same. Fig. 3, is a detail view of one of the eccentric bearings. Fig. 4, is a detail horizontal section through the ends of the engine shafts.

The same numerals refer to like parts in all the figures.

1, indicates a frame; 2, a front axle and supporting wheels, and 3, a rear axle and supporting wheels. On a cross bar 4, of frame 1, are two engines 5—5, of appropriate type. The shafts 6—6, of the engines are independent of each other, and each carries a fly-wheel 7.

Intermediate the engines 5—5, is a friction disk 8, having a hub 9, the opposite faces of which form parts of two clutches 10—10, the other parts 11—11, of said clutches being mounted on the shafts 6—6. Members 11—11, are provided with grooved collars 12—12, which receive the ends of operating levers 13—13.

Extending rearwardly from the engines 5—5, are two counter shafts 14 and 15, mounted in forward bearings 16 and rear bearings 17, and 17′, bearing 17 being stationary while bearing 17′ is slidably mounted in frame 1, and bearings 16, are adjustable. Each bearing 16, comprises a sleeve mounted in a socket extending from the engine, and is provided with an opening to receive a counter shaft. The opening 16′, is arranged eccentric so that when the sleeve is turned the counter shaft will be moved laterally.

Splined on the shafts 14 and 15, are two friction gears 18, and 19, having on their peripheries paper or other like material, and having grooved outwardly extending hubs 20. The friction gears are located between the friction disk 8, and the fly-wheels 7. Near the opposite end of shaft 14, is a metal friction gear 21, and a raw hide toothed pinion 22. On the companion counter shaft 15, and adjacent the friction gear 21, is a friction gear 23, having paper on its periphery, as shown at 24.

The transmission gears 21, and 23, engage with each other, and transmit power from the engines to the shaft 3. The rear of the shaft 15, is mounted in the bearing 17′, between which and the frame 1, is a spring 25, designed to keep the peripheries of the transmission friction gears 21, and 23, in contact with each other.

Meshing with the pinion 22, is a gear wheel 26, mounted on a short shaft 27, and coupled to the latter by a universal joint 28, is a shaft 30, which is connected to the rear axle 3, by a gear 31. Shaft 30, is in two sections, connected by a coupling 32, to allow for movement imparted in the ordinary travel of the vehicle.

The bearings 16, are designed to be adjusted to cause the friction gears 18 and 19, to simultaneously engage the friction disk 8, or the fly-wheels 7, according to the direction it is desired to run the vehicle. From each bearing 16, extends an arm 33, connected by links 34, with arms 35, on a shaft 36. From the shaft 36, extends an arm 37, connected by a link 38, with a bell crank foot lever 39, pivotally mounted in convenient reach of the operator. By pressing the bell crank lever forward, the arms 33, are drawn upwardly and the shafts 15 and 16, thrown out slightly, which causes the peripheries of the friction gears 18 and 19, to contact with the inner faces of the fly wheels 7—7, which will cause the vehicle to run back. By tilting the bell crank lever in the opposite direction arms 33, are depressed, and the shafts 14 and 15, are drawn toward each other, and the peripheries of the friction gears are caused to contact with the faces of the friction disk 8, and the vehicle will run forward. Obviously when the friction gears 18 are intermediate the friction disk 8 and fly wheels 7—7 no power will be transmitted.

It may be noted at this point that but one of the engines may be coupled to the friction disk at a time, should occasion require, by operating one of the levers 13, to disengage a clutch 10.

Fitting in the grooves of the hubs 20—20, are the yoked ends of links 40—40, connected to arms 41—41, extending from a rock shaft 42, operated by a hand lever 43. The object of this system of levers is to vary the speed of the vehicle, and by operating the hand lever 43, the change can be readily accomplished. Obviously where the friction gears 18, and 19, are near the outer edge of the friction disk 8 and fly wheels 7—7, the speed of the vehicle will be greater than when the friction gears are near the centers of the said friction disk and fly wheels.

Power is transmitted from the engines to the power shafts 14 and 15, to the transmission gears 21, and 23, to the gears 22, and 26, to the axle and wheels 3.

The invention is extremely simple in construction, and by the arrangement of parts as described, complicated and expensive mechanism is to a large degree dispensed with.

The hub 9, is beveled, and formed preferably of paper to provide suitable frictional contact surfaces, to act as a pair of frictional beveled gears. The two friction gears 18 and 19, are beveled on their faces toward the engines, and are adapted to coöperate with the beveled hub to obtain the greatest amount of power from the engines when desired. The friction gears 18 and 19, are constructed alike, and each consists of a detachable beveled ring 18$^a$, cut out on the inner side to form a pocket to receive the paper 18$^b$, which is designed to contact with the disk 8. After the paper ring 18$^a$, is placed against the base of the gear, the paper ring and beveled ring are properly positioned and bolts 18$^c$, securely hold the rings rigid.

For hill climbing for instance, the construction described is of importance. When the lever 43, is moved forward the beveled faces of rings 18$^a$, contact with the beveled faces of the hub 9, and a slow but powerful force is transferred from both the engines to the gearing. Furthermore, this specific construction enables me to have a greater contact surface between the gears, than when the peripheries of gears 18 and 19, contact with the faces of the disk, as previously described.

What I claim is—

1. In a transmission gear, the combination with a pair of engines including shafts and wheels, of a friction disk interposed between said shafts, means for connecting one or both of said shafts to the friction disk, two counter shafts, a friction gear on each counter shaft located each side the friction disk, an eccentric bearing for each counter shaft, means for simultaneously turning the eccentric bearings to cause the friction gears to engage opposite sides of the friction disk or to engage the two fly-wheels, transmission friction gears on the counter shaft, and a pinion on one of said counter shafts.

2. In a transmission gear, the combination with a pair of engines including shafts and wheels, of a friction disk interposed between said shafts, means for connecting one or both of said shafts to the friction disk, two counter shafts, a friction gear on each counter shaft located each side the friction disk, an eccentric bearing for each counter shaft, means for simultaneously turning the eccentric bearings to cause the friction gears to engage opposite sides of the friction disk or to engage the two fly-wheels, transmission friction gears on the counter shaft, a slidable bearing for one of said counter shafts, a spring normally holding said bearing toward the other counter shaft, and a pinion on one of the counter shafts.

3. In a transmission gear, the combination of a pair of engines, each engine including a shaft and a fly-wheel, of a friction disk mounted between the engines, a clutch on each side the friction disk to connect one or both engines to said disk, levers to operate the clutches, two counter shafts, a stationary bearing, eccentric bearings, a movable bearing, one of said counter shafts being mounted in a stationary bearing, and one of the eccentric bearings, the other counter shaft being mounted in one of the eccentric bearings, and the movable bearing, friction gears slidably mounted on said two counter shafts, levers connected to the friction gears to simultaneously slide them to or from the engines, gears on the counter shafts, means for operating the eccentric bearings to cause the friction gears to contact with opposite faces of the friction disk or with the fly wheels, an axle, and gears between the axle and the gears on the counter shafts.

4. In a transmission gear, the combination of a pair of engines, each engine including a shaft and a fly-wheel, a friction disk interposed between the engines, a pair of counter shafts extending from the engines, friction-gears carried by said shafts, means for engaging the friction gears with opposite sides of the friction disk or with the fly-wheels, gears connecting the counter-shafts, an axle, supporting wheels mounted on the axle, a gear on the axle, a coupling connecting the sections of said shaft, a universal joint, and gears between the universal joint and the gears on the counter shaft.

5. In a transmission gear, the combination with a pair of engines, each engine including a shaft and a fly-wheel, of a friction disk interposed between the engines, means for connecting the friction disk to one or both engines, a pair of counter shafts, friction gears mounted on the counter shafts between the fly-wheels and the friction disk, a second pair of friction gears mounted on said counter shafts, means for moving the counter shafts to cause the first said friction gears to engage opposite sides of the friction disk or with the fly-wheels, a spring actuated bearing for forcing one of said counter shafts toward the other to hold the second set of friction gears in contact with each other, and a drive-pinion on one of said counter shafts.

6. In a transmission gear, the combination with a pair of engines, of a friction disk, a pair of fly-wheels, slidably mounted friction gears interposed between the friction disk and the fly-wheels, eccentric bearings, counter shafts mounted in the eccentric bearings, friction gears on the counter shafts, a rock shaft, links connecting the eccentric bearings with said rock shaft, and a foot lever for operating the rock shaft to throw the friction gears in contact with the opposite sides of the disk or the fly-wheels.

7. In a transmission gear, the combination with a pair of engines, each engine including a shaft, of a friction disk mounted between the engines and on the shafts thereof, a hub on the disk having two beveled friction surfaces, a friction gear each side the friction disk, each friction gear having a beveled frictional surface and a peripherical friction surface, means for causing the peripherical surfaces to simultaneously contact with the disk, and also for causing the beveled frictional surfaces of the gears to contact with the beveled frictional surfaces of the hub.

In testimony whereof I hereunto affix my signature in presence of two witnesses whose signatures are hereunto affixed.

ELIHU BURRETT KENT.

Witnesses:
SARAH W. FRASER,
HATTIE M. KENT.